United States Patent [19]

Saegusa et al.

[11] Patent Number: 4,585,835

[45] Date of Patent: Apr. 29, 1986

[54] POLYMER COMPOSITIONS

[75] Inventors: Takeo Saegusa, Kyoto; Yoshiyuki Sano; Yoshiharu Kimura, both of Shiga; Osami Shinonome; Taro Tokuzawa, both of Kyoto, all of Japan

[73] Assignee: Unitika Ltd., Hyogo, Japan

[21] Appl. No.: 685,621

[22] Filed: Dec. 24, 1984

Related U.S. Application Data

[63] Continuation of Ser. No. 439,251, Nov. 4, 1982, abandoned.

[30] Foreign Application Priority Data

Nov. 5, 1981 [JP] Japan .................................. 56-177420
Nov. 5, 1981 [JP] Japan .................................. 56-177421

[51] Int. Cl.$^4$ ............................................. C08L 71/02
[52] U.S. Cl. ....................................... 525/430; 525/408
[58] Field of Search ................................. 525/408, 430

[56] References Cited

U.S. PATENT DOCUMENTS

| | | | |
|---|---|---|---|
| 3,514,498 | 5/1970 | Okazaki | 525/430 |
| 3,637,900 | 1/1972 | Kimura | 525/430 |
| 3,787,524 | 1/1974 | Crescentini | 525/430 |
| 3,917,740 | 11/1975 | Siclari | 525/430 |
| 3,937,725 | 2/1976 | Pfeifer | 525/430 |
| 4,024,205 | 5/1977 | Login | 525/430 |
| 4,035,441 | 7/1977 | Endo | 264/171 |
| 4,066,592 | 1/1978 | Wismer | 260/29.2 |
| 4,336,685 | 6/1982 | Eisenstein | 57/238 |

FOREIGN PATENT DOCUMENTS

| | | | |
|---|---|---|---|
| 54-125246 | 9/1979 | Japan . | |
| 2075036 | 11/1981 | United Kingdom | 524/539 |

*Primary Examiner*—John C. Bleutge
*Assistant Examiner*—Patricia A. Short
*Attorney, Agent, or Firm*—Sughrue, Mion, Zinn, Macpeak and Seas

[57] ABSTRACT

A polymer composition is disclosed. The polymer is comprised of a polymer (A) having a sulfo and/or carboxy ammonium zwitterion structure and an organic synthetic polymer (B), wherein either of the following condition (i) or (ii) is satisfied: (i) (A) is a polymer having 0 to 80% by weight of the polyalkylene oxide component, and (ii) (A) is a copolymer having 80% by weight or more of the polyalkylene oxide component and (B) is a polymer comprising polyalkylene oxide as a copolymer component. The polymer composition can be used in the production of fibers, films and other shaped articles. The products utilizing the disclosed polymer composition have excellent hydrophilic properties which are maintained even after exposure to numerous washings.

9 Claims, No Drawings

POLYMER COMPOSITIONS

This is a continuation of application Ser. No. 439,251 filed Nov. 4, 1982, now abandoned.

FIELD OF THE INVENTION

The present invention relates to polymer compositions having a hydrophilic property which are suitable for making fibers, films and other shaped articles.

BACKGROUND OF THE INVENTION

A number of attempts have been made at imparting a hygroscopic property, a water absorbing property, a water conducting property or an antistatic property, etc., to synthetic polymers by processing the polymers so they have a hydrophilic property. One of the most widely known proposals involves a process which comprises blending a modifier, particularly, a polyalkylene oxide compound with a synthetic polymer.

However, when incorporating the modifier in the synthetic polymer, the following problems are frequently pointed out: (1) the durability of the hydrophilic effect is inferior because the modifier falls off due to heat treatment, hot water treatment, dyeing treatment, friction or use for a long time, etc., (2) inversely, the modifier is restricted in the synthetic polymer to reduce its mobility, by which it is difficult to exhibit its hydrophilic effect, and (3) the compatibility of the modifier with the synthetic polymer is not sufficient, by which it is difficult to disperse the modifier by mixing, which deteriorates workability and properties of the products.

As a result of earnest studies relating to these problems, the present inventors have found that compositions having suitable dispersibility and bleeding property are formed by the presence of a zwitterion structure and a polyalkylene oxide component in a specified state, by which there are obtained products having good and lasting hydrophilic characteristics and durability thereof.

SUMMARY OF THE INVENTION

The present invention relates to polymer compositions comprising a polymer (A) having a sulfo and/or carboxy ammonium zwitterion structure and an organic synthetic polymer (B), wherein either the following condition (i) or (ii) is satisfied:

(i) (A) is a polymer having 0 to 80% by weight of the polyalkylene oxide component, and (ii) (A) is a polymer having 80% by weight or more of the polyalkylene oxide component and (B) is a polymer comprising polyalkylene oxide as a copolymer component.

DETAILED DESCRIPTION OF THE INVENTION

First, the condition (i) is illustrated.

The polymer (A) having a zwitterion structure of the present invention (condition (i)) is represented by the following general formula (I):

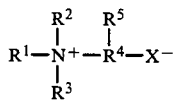

wherein $R^1$, $R^2$ and $R^3$ each represents a hydrogen or a monovalent organic group ($R^1$, $R^2$ and $R^3$ may combine to form a ring), $R^4$ represents a trivalent organic group, $R^5$ represents a hydrogen or a monovalent organic group, X represents $-SO_3$ or $-CO_2$, and at least one of $R^1$ to $R^5$ is a polymer chain in which 0 to 80% by weight is composed of polyalkylene oxide segments, preferably a polymer having 5 to 70% by weight of polyalkylene oxide, more preferably a polymer having 10 to 60% by weight of polyalkylene oxide. These polyalkylene oxide segments have a number average molecular weight of 400 to 20,000, preferably 800 to 15,000, more preferably 1,000 to 10,000. The polymers (A) preferably have a basic skeleton selected from the group consisting of polyester, polyamide and polyolefin.

The polymers (A) having the zwitterion structure of the present invention (condition (i)) can be generally classified into the following three kinds.

(1) Polymers obtained from a polymerizable compound having a sulfo- and/or carboxy ammonium zwitterion structure (hereinafter, referred to as a zwitterion structure).

(2) Polymers obtained by copolymerization of a polymerizable compound having a quaternary ammonium group and a polymerizable compound having a sulfonic acid group (or a carboxylic acid group) or a sulfonic acid metal salt group (or a carboxylic acid salt group).

(3) Polymers obtained by processing a polymer having a group capable of forming a zwitterion structure by processing so as to form such a structure.

These polymers are described further below.

With respect to type (1) polymers, there are polycondensation type polymers (1)-a which are prepared by polycondensation of compounds having a zwitterion structure and preferably two functional groups capable of forming an ester or amide, such as hydroxyl group, carboxyl group or amino group, etc. The compounds may have one or three or more groups in order to control the molecular weight of the polymer (A) or the degree of branching thereof. The compounds may be polycondensated by themselves or by copolycondensation of the abovedescribed compound with a polycondensable compound having no zwitterion structure. Typical examples of these polymers are prepared by polycondensation of compounds which are obtained by sulfo (or carboxy) ammonium zwitterionization of compounds represented by the general formula:

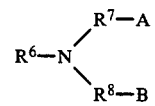

wherein $R^6$ represents a monovalent organic group, $R^7$ and $R^8$ each represents a divalent organic group, and A and B each represents a group selected from the group consisting of a hydroxyl group, a carboxyl group, a carboalkoxy group and an amino group. These polymers can be produced by a known process. Specifically, the process may be a condensation reaction of above compound with an alkali metal salt of sulfonic acid (or carboxylic acid) of halogenated (Cl or Br) hydrocarbon or a ring-cleavage addition reaction of sultones (or lactones). Compounds which are obtained by modifying the hydroxyl group or the carboxyl group of the abovedescribed zwitterionized product by a known process may be used. An example of such a process is cyanoethylating the hydroxyl group with acrylonitrile and thereafter reducing to form an amino group. Also, compounds selected from salts of the abovedescribed zwitterionized products such as Li, Na, K, Mg, Ca, Ba or Al salt thereof, etc., may be used. Type (1)-a polymers are prepared by polycondensation of above zwitterionized compounds themselves, or by adding them to a suitable combination composed of adipic acid, sebacic acid, terephthalic acid, isophthalic acid and esters or halides of them, glycols such as ethylene glycol, diethylene glycol, propylene glycol or 1,4-butanediol, etc., bisphenols such as 2,2-bis(p-hydroxyphenyl)propane or bis(p-hydroxyphenyl)sulfone, etc., diamines such as ethylenediamine, hexamethylenediamine, piperazine, phenylenediamine or xylylenediamine, etc., lactams such as caprolactam or lauryl lactam, etc., and aminocarboxylic acids such as aminocaproic acid or aminolauric acid, etc., to cause copolycondensation in case of synthesizing polyester, polyamide or polyesteramide.

Polyaddition type polymers (1)-b are obtained from compounds having a zwitterion structure and a functional group capable of causing polyaddition reaction. It is suitable to use polymers obtained by a polyaddition reaction of the zwitterionized product having two hydroxyl groups described in (1)-a with diisocyanate such as 2,4- or 2,6-tolylenediisocyanate, hexamethylenediisocyanate or naphthalene-1,5-diisocyanate, etc., or 1,2-bis(acryloyloxy)ethane.

Addition polymerization type polymers (1)-c are obtained from compounds having a zwitterion structure and an unsaturated group or a ring capable of causing an addition polymerization reaction. Typical examples of them include polymers obtained by addition polymerization of a compound represented by the general formula:

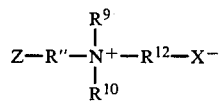

wherein Z represents $CH_2=CH-C_6H_4-$, $CH_2=CHCOO-$, $CH_2=C(CH_2)COO-$, $CH_2=CHCONH-$, $CH_2=C(CH_3)CONH-$, $CH_2=CHCH_2O-$ or

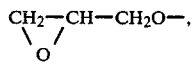

$R^9$ and $R^{10}$ represent a monovalent organic group, $R^{11}$ and $R^{12}$ represent a divalent organic group, and X represents $-SO_2$ or $-CO_2$; and polymers obtained by copolymerization of the abovedescribed compound with a polymerizable compound having no zwitterion structure such as styrene, vinyl acetate, acrylonitrile, vinyl chloride, acrylic acid or ester thereof, or methacrylic acid or its ester, etc.

With respect to type (2) polymers, those of type (2)-a and type (2)-b are preferred. The type (2)-a polymers are obtained by a condensation reaction of N,N-dialkyl-N,N-bis(hydroxyalkyl)ammonium salt with 5-alkali metal sulfoisophthalic acid or its ester or halide. The type (2)-b polymers are obtained by a copolymerization reaction of a nitrogen containing compound such as p-aminostyrene, 4-vinylpyridine or onium salts thereof, etc., and p-styrenesulfonic acid, p-styrenecarboxylic acid, allylsulfonic acid, acrylic acid, methacrylic acid or metal salts thereof.

With respect to type (3) polymers, it is preferable to use polymers obtained by reacting a polymer containing a p-aminostyrene component with sulfonic acid (or carboxylic acid) metal salt of halogenated hydrocarbon, polymers obtained by reacting a polymer containing a p-styrenesulfonic acid (or carboxylic acid) component and a p-chloromethylstyrene component with amine, and polymers obtained by reacting a polymer containing an acrylic acid (or methacrylic acid) chloride component with a compound having a hydroxyl group and a zwitterion structure.

With respect to polymers (A) of the present invention (condition (i)), it is not always necessary that the sulfo (or carboxy) structure and the ammonium structure are bonded by a short chain. Furthermore, polymers in which the so-called macro zwitterion structure is formed are included in the scope of the present invention.

It should be noted that with respect to the polymers (A) of the present invention (condition (i)), polymers having 80% by weight or less of polyalkylene oxide segments in the polymer chain are advantageously used. The following are examples of polymers having polyalkylene oxide segments.

(a) Polymers obtained by adding polyalkylene oxide having ester or amide forming functional groups such as hydroxyl groups, carboxyl groups or amino groups, etc., on the ends thereof to cause copolycondensation in case of synthesizing polymers of the type (1)-a.

(b) Polymers obtained by adding a polyalkylene oxide compound having a zwitterion structure and ester or amide forming functional groups, for example, N,N-bis-(polyoxyalkylene)-N-alkyl (or aryl)-N-sulfo (or carboxy)-alkyl (or aryl) ammonium betaine having ester or amide forming functional groups on the end of the polyalkylene oxide chain thereof, to cause copolycondensation in the case of synthesizing polyester, polyamide or polyesteramide.

(c) Polymers obtained by adding polyalkylene oxide having hydroxyl groups to cause copolymerization in the case of synthesizing polymers of the type (1)-b.

(d) Polymers obtained by reacting hydroxyl groups containing compound in the polyalkylene oxide having a zwitterion structure described in (a) with diisocyanate.

(e) Polymers obtained by copolymerizing a polyalkylene oxide compound having an addition polymerizable unsaturated group, for example, acrylic acid (or methacrylic acid) ester of polyalkylene glycol, in the case of synthesizing polymers of the type (1)-c.

(f) Polymers obtained by copolymerizing a compound having a zwitterion structure on an end of the polyalkylene oxide chain and an acryloyl group (or a methacryloyl group) on the other end thereof with conventional vinyl monomers.

These polymers are desirable because they cause only a small reduction in mobility when added to synthetic polymer (B), as compared with the known block copolymers comprising a polyalkylene oxide compound as a component.

As described above, there are many kinds of polymers (A) used in the condition (i). Their composition and structure are suitably selected according to use of the polymer composition, its required hydrophilic property, and the kind of synthetic polymer (B). In the above-described polymers (A) in the condition (i), the polymers (I) obtained by adding compounds having a sulfo or carboxy zwitterion structure and two functional groups capable of forming an ester or amide in the case of synthesizing the thermoplastic polymer such as polyester, polyamide or polyesteramide, the polymers (II) obtained by copolymerization reaction of the above-described polymers (I) with polyalkylene oxide component, the polymers (III) obtained by adding N,N-bis(polyoxyalkylene)-N-alkyl (or aryl)-N-sulfo (or carboxy)alkyl (or aryl) ammonium betaine having two functional groups capable of forming an ester or amide on the end of the polyalkylene oxide chain thereof in the case of synthesizing polyester, polyamide or polyesteramide, the polymers (IV) obtained by copolymerization of 1-alkylvinylpyridine and styrenesulfonic acid and the polymers (V) obtained by copolymerization of 1-alkylvinylpyridine, styrenesulfonic acid and monoacrylic acid (or methacrylic acid) ester of polyalkylene oxide are more preferred.

Examples of synthetic polymer (B) in the condition (i) include polyethylene terephthalate, polybutylene terephthalate, poly-1,4-cyclohexylenedimethylene terephthalate and poly-p-ethyleneoxybenzoate, etc., and polyesters composed of them as a major component, nylon 6 (polycapramide), nylon 12 (polydodecanamide), nylon 66 (polyhexamethylene adipamide), nylon 610 (polyhexamethylene sebacamide), poly-m-phenylene isophthalamide and poly-p-phenylene terephthalamide and polyamides composed of them as a major component, polyethylene, polypropylene, polystyrene, polymethyl methacrylate, polyacrylonitrile, polyvinyl chloride and polyvinylidene chloride, etc., and vinyl polymers composed of them as a major component, polybutadiene and polyisoprene, etc., and diene polymers composed of them as a major component, and other synthetic polymers having a poor hydrophilic property including thermosetting polymers, preferably polymer having a basic skeleton selected from the group consisting of a polyester, a polyamide or a polyolefin, more preferably polyethylene terephthalate, polybutylene terephthalate, polycapramide, polydodecanamide, polyhexamethylene adipamide, polyhexamethylene sebacamide, polyethylene, polypropylene and thermoplastic polymers having a good melt processability such as polymers composed of them as a major component. In this case, when polyester or polyamide having polyalkylene oxide segments as a block component is used as the synthetic polymer (B) or a polyalkylene oxide compound used generally as an antistatic agent is present, good effects are shown in cooperation with the activity of the polymer (A) having a zwitterion structure.

The polyalkylene oxides used in condition (i) of the present invention are preferably selected from the group consisting of polyethylene oxide, polypropylene oxide and ethylene oxide-polypropylene oxide copolymer.

Under condition (i), the amount of the zwitterion structure is 200 equivalents/ton or more, preferably 250 equivalents/ton or more, more preferably 300 equivalents/ton or more in the polymer (A) and 30 equivalents/ton or more, preferably 40 equivalents/ton or more, more preferably 50 equivalents/ton or more in the polymer composition. Further, when the polyalkylene oxide segments are present as part of polymer (A) and/or polymer (B) or as an additive, it is possible to reduce the amount thereof.

In the following, condition (ii) is illustrated.

The polymer (A) having a zwitterion structure in the present invention (condition (ii)) is represented by the general formula (I) as described above wherein the polymer chain is composed of a polyalkylene oxide segments in an amount of 80% by weight or more. The polymers (A) of the present invention (condition (ii)) are obtained in the same procedure as in the preparation of polymers (a) to (f) in the case of the above-described condition (i). Examples of them include N,N-bis(-polyoxyalkylene)-N-alkyl ($C_8$ to $C_{24}$)-N-carboxyalkyl ($C_1$ to $C_4$) ammonium betaine, N,N-bis(alkanoyl ($C_8$ to $C_{24}$)-iminoethylene)-N-polyoxyalkylene-N-carboxyalkyl ($C_1$ to $C_4$) ammonium betaine, N'-(N-alkanoyl ($C_8$ to $C_{20}$) aminoethyl-N-polyoxyalkyleneaminoethyl)-N',N'-bis(polyoxyalkylene)-N'-carboxymethylammonium betaine, N-$\beta$-hydroxyalkyl ($C_6$ to $C_{28}$)-N,N',N'-tris(-polyoxyalkylene)ethylenediamine-N,N'-carboxymethyldibetaine, N,N'-bis($\beta$-hydroxyalkyl ($C_6$ to $C_{28}$))-N,N'-bis(polyoxyalkylene)ethylenediamine-N-carboxymethylbetaine, N-$\beta$-hydroxyalkyl ($C_6$ to $C_{28}$)-N,N'-bis-(polyoxyalkylene)-N-carboxyalkyl ($C_1$ to $C_4$) ammonium betaine, N-polyoxyalkylene-N',N'-bis(polyoxyalkylene)-aminoalkyl ($C_2$ to $C_4$)-N-alkyl ($C_1$ to $C_{30}$)-N-sulfoalkyl ($C_1$ to $C_4$) ammonium betaine, N,N',N'-tris(-polyoxyalkylene)-aminoalkyl ($C_2$ to $C_4$)-N-alkyl ($C_1$ to $C_{30}$)-N,N'-bis-(sulfoalkyl ($C_1$ to $C_4$) ammonium)-dibetaine, N,N-bis-(polyoxyalkylene)-N-alkyl ($C_1$ to $C_{30}$)-N-sulfoalkyl ($C_1$ to $C_4$) ammonium betaine, and N,N,N-trialkyl ($C_1$ to $C_{30}$)-N-sulfoalkyl ($C_1$ to $C_4$) polyoxyalkyleneammonium betaine, etc., and salts of them, such as Li, Na, K, Mg and Ca salts of them. These compounds can be produced by known methods, for example, a condensation reaction with an alkali metal salt of sulfonic acid (or carboxylic acid) of halogenated (Cl or Br) hydrocarbon or a ring-cleavage addition reaction of sultones (or lactones) after the addition reaction of alkylene oxide and laurylamine, and compounds having a number average molecular weight of 400 to 20,000 are advantageously used, preferably compounds having a number average molecular weight of 800 to 15,000, more preferably 1,000 to 10,000. They may be used alone or as a combination of two or more of them.

The polymer (B) is a synthetic polymer comprising polyalkylene oxide as a copolymerization component. The polymer is obtained by polycondensation, polyaddition or addition polymerization, etc. Examples of particularly preferred polymers include block copolymers obtained by adding polyalkylene oxide such as polyethylene oxide, polypropylene oxide or ethylene oxide-propylene oxide copolymer, which has an ester or amide forming functional group such as a hydroxyl group, carboxyl group, carboalkoxy group or amino group, etc., on at least one end thereof to cause copolymerization in case of synthesizing polyester or polyamide such as polyethylene terephthalate, polybutylene terephthalate, poly-p-ethyleneoxy benzoate, nylon 6, nylon 12, nylon 66 or nylon 610, etc., preferably polymer having a basic skeleton selected from the group consisting of a polyester, a polyamide or a polyolefin.

The polyalkylene oxides used in condition (ii) of the present invention are preferably selected from the group consisting of polyethylene oxide, polypropylene oxide and ethylene oxide-polypropylene oxide copolymer.

It is preferred that polyalkylene oxide having a number average molecular weight of 400 to 20,000, preferably 800 to 15,000, more preferably 1,000 to 10,000, is copolymerized so that the content thereof in the polymer (B) is 0.05 to 50% by weight, preferably 0.1 to 30% by weight, more preferably 0.2 to 20% by weight. Useful examples of preferred polyalkylene oxide compounds may be obtained by adding alkylene oxide to bisphenols such as 2,2-(p-hydroxyphenyl)propane or bis(p-hydroxyphenyl)sulfone, etc. (which have a hydroxyl group on the end), and compounds having a carboxyl group or amino group, etc., on the end thereof which are obtained by modifying the above-described compounds. These compounds are desirable because of their good heat resistance.

Under condition (ii), the amount of the zwitterion structure in the polymer (A) is 30 equivalents/ton or more, preferably 40 equivalents/ton or more and the amount of polymer (A) in the polymer composition is 0.5 to 10% by weight, preferably 1 to 5% by weight.

The polymer compositions of the present invention can be formed into fibers, films, sheets, strands, chips and other shaped articles by a known method for blending and shaping, namely, by adding the polymer (A) in a molten state or a solution state during synthesizing or shaping of the synthetic polymer (B).

Preferred examples of the polymer compositions of the present invention are a polymer composition which comprises the polymer (A) obtained by adding a compound which is selected from the group consisting of N,N-bis-(polyoxyalkylene)-N-alkyl (or aryl)-N-sulfo (or carboxy)-alkyl (or aryl) ammonium betaine having an ester or amide forming functional group on the end of the polyalkylene oxide chain thereof when synthesizing polyester, polyamide or polyesteramide to cause copolycondensation, and a polyester or polyamide (B), and a polymer composition which comprises a polyalkylene oxide polymer (A) having a sulfo and/or carboxyammonium zwitterion structure, and polyester or polyamide (B) composed of polyalkylene oxide as a copolymer component.

It is also possible for the polymer compositions of the present invention to blend with or use together with other polymers as long as their hydrophilic effect is kept, and modifiers such as coloring agents, heat stabilizer, light stabilizer, matting agents, fire retardants and foaming agents, etc., may be added to the polymer compositions of the present invention.

In the following, the present invention is illustrated in greater detail with reference of examples. However, present invention is not limited to these examples. The hydrophilic property (water absorbing property) was determined by the JIS L-1096 dropping method (Japanese Industrial Standard), wherein a time of 3 seconds or less was evaluated as good. Measurement of the antistatic property by a rotary static tester method of Kyoto University was carried out in an atmosphere at 20° C. and 40% RH using a cotton cloth as a rubbing means to determine a frictional static voltage and its half-life. (Parts are by weight.)

EXAMPLE 1

Sodium chloromethanesulfonate was added to N-butyldiethanolamine, and desalting was carried out to obtain N-butyl-N,N-bis(hydroxyethyl)-N-sulfomethylammonium betaine (I).

Then, 40 parts of bis($\beta$-hydroxyethyl)-terephthalate, 40 parts of bis($\beta$-hydroxyethyl)-isophthalate, 20 parts of the compound (I) and 0.02 part of zinc acetate were put in a reaction vessel equipped with a stirrer. After the reaction was carried out for 1 hour under atmospheric pressure while maintaining the temperature of 210° C., the pressure was gradually reduced, resulting in 0.1 torr after 30 minutes. Further, the polycondensation reaction was carried out for 3 hours to obtain a polymer ($A_1$).

20 parts of this polymer ($A_1$) were blended with 80 parts of polyethylene terephthalate ($B_1$). The mixture was spun by means of an extruder type melt spinning machine at a melting temperature of 280° C. under a condition of a residence time of 5 minutes. Drawing was then carried out at 90° C. to obtain drawn yarns of 75 d/16 f which had a strength of 3.8 g/d and an elongation of 30%. The workability during spinning and drawing were good.

Using these drawn yarns, taffeta cloth having a density of weft 110 ends/2.54 cm and warp 100 ends/2.54 cm was made by weaving. The cloth was then subjected to scouring and dyed in a bath containing a blue disperse dye at 120° C. for 1 hour. The resulting dyed cloth had a good hydrophilic property. This property did not change after home laundry (which comprised treating the cloth at room temperature for 1 hour in a cleaning solution containing 1 g/l of a neutral detergent) was repeated 50 times.

EXAMPLES 2 & 3

N-Lauryl-N,N-bis(p-carboxypropyl)amine was allowed to react with pivalolactone to obtain a compound (II) having a carboxyammonium zwitterion structure by desalting.

Then, 80 parts of caprolactam, 20 parts of the compound (II), 4.5 parts of hexamethylenediamine and 5 parts of water were put in a polymerization vessel equipped with a stirrer. Polycondensation was carried out while maintaining the temperature at 230° C. under a condition of a pressure increasing period of 3 kg/cm$^2$×3 hours and a pressure release period of 1 hour to obtain a polymer ($A_2$).

This polymer ($A_2$) was added in an amount of 20% by weight to nylon 6 ($B_2$) (Example 2) and polyethylene terephthalate ($B_1$) (Example 3), respectively, and the mixtures were subjected to melt spinning at 275° C. and drawing to obtain drawn yarns of 75 d/16 f.

Using these drawn yarns, cloths were woven in the same manner as in Example 1. The cloths were dyed at 100° C. for 1 hour in an acid dye bath in case of nylon fibers (Example 2) and at 120° C. for 1 hour in a disperse dye bath in case of polyester fibers (Example 3). The hydrophilic property of the dyed cloths and that after washed 50 times by home laundry were both good.

EXAMPLE 4

After a compound obtained by adding 50 times by mol of ethylene oxide to stearylamine was allowed to react with sodium monochloromethanesulfonate, desalting was carried out to obtain N,N-bis(polyoxyethylene)-N-stearylsulfomethylammonium betaine (III).

Then, 80 parts of terephthalic acid, 20 parts of adipic acid and 65 parts of ethylene glycol were put in a reaction vessel equipped with a stirrer. After the esterification reaction was carried out for 4 hours under a condition of 4 kg/cm$^2$ and 240° C., 100 parts of the compound (III) and 0.03 part of antimony trioxide were added. While maintaining the temperature at 240° C., the pressure was gradually reduced to result in 0.1 torr after 1 hour, and a polycondensation reaction was carried out for 3 hours to obtain block copolymer chips ($A_3$).

10 parts of the block copoymer chips ($A_3$) were blended with 90 parts of polyethylene terephthalate chips ($B_1$), and the mixture was spun by means of an extruder type melt-spinning machine at a melting temperature of 280° C. under a condition of a residence time of 10 minutes. Drawing was then carried out to obtain drawn yarns of 75 d/24 f which had a strength of 4.3 g/d and an elongation of 30%. Operating properties during spinning and drawing were good.

After obtaining a knitted cloth having a density of 60 g/m² using the resulting drawn yarns, the cloth was subjected to scouring and then high pressure dyeing at 125° C. in a solution containing a blue disperse dye for 1 hour. The frictional static voltage of the resulting cloth and its half-life were 1,200 V and 15 seconds, respectively, and a good antistatic property was observed.

After being washed 50 times by home laundry, the antistatic property was good.

EXAMPLE 5

A block copolymer ($A_4$) was obtained by polycondensation in the same manner as in Example 4 using 2 parts of the compound (I) and 60 parts of polyethylene oxide having hydroxyl groups on its both ends (average molecular weight: 4,000) instead of the compound (III).

This block copolymer ($A_4$) was added in an amount of 10% by weight to polyethylene terephthalate ($B_1$). When spinning, weaving, scouring and dyeing were carried out according to Example 4, cloth which showed a frictional static voltage of 1,200 V and its half-life of 16 seconds was obtained. This property hardly deteriorated after being washed 50 times by home laundry.

EXAMPLE 6

95 parts of polyethylene terephthalate ($B_3$) which was copolymerized with 5% by weight of polyethylene oxide (average molecular weight: 4,000) were blended with 5 parts of the polymer ($A_1$). When spinning and other operations were carried out as in Example 4, cloth which showed good antistatic property (fractional static voltage: 1,500 V, half-life: 18 seconds) and good endurance (antiwashing property) was obtained.

EXAMPLE 7

Cloth having a good antistatic property (frictional static voltage: 1,200 V, half-life: 15 seconds) and good endurance was obtained as in Example 4 by using a salt (IV) obtained by reacting the compound (III) with calcium hydroxide.

EXAMPLE 8

A compound obtained by reacting N,N-dimethyl-monoethanolamine with sodium chloroacetate was allowed to react with acrylic acid chloride to obtain acrylic acid ester (V) having a carboxyammonium zwitterion structure.

Then, 30 parts of the compound (V), 70 parts of water and 0.2 part of potassium persulfate were put in a reaction vessel, and polymerization was carried out at 50° C. for 3 hours to obtain a polymer ($A_5$).

The polymer ($A_5$) was added in an amount of 3% by weight to conventional polypropylene ($B_4$). The resulting mixture was melt shaped into film. The resulting stretched film had a frictional static voltage of 1,500 V and a charge half-life of 12 seconds, and a good antistatic property was observed.

EXAMPLE 9

When a polymer ($A_6$) obtained by radical copolymerization of 1-ethyl-4-vinylpyridine chloride and sodium p-styrenesulfonate in equimolar amounts and thereafter desalting was added similarly to Example 8 to form a film of polypropylene ($B_4$), a film having a good antistatic effect was obtained.

EXAMPLE 10

A compound obtained by esterifying one end of polyethylene glycol having an average molecular weight of 2,000 with acrylic acid was added in an amount of 50% by weight to the compound (V) when synthesizing the polymer ($A_5$) in Example 8 to obtain a polymer ($A_7$).

When the polymer ($A_7$) was added in an amount of 2% by weight to form films of polypropylene ($B_4$), films having a good antistatic effect were obtained.

EXAMPLE 11

96 parts of ε-caprolactam, 1 part of bis(3-aminopropyl ether) of polyethylene oxide (average molecular weight: 3,000), 3 parts of N,N-bis(polyoxyethylene)-N-stearyl-N-carboxymethyl ammonium betaine (average molecular weight: 4,000), 0.03 part of adipic acid and 7 parts of water were put in a polymerization vessel equipped with a stirrer. While maintaining the temperature at 260° C., polycondensation was carried out under a condition of a pressure increasing period of 4 kg/cm²×3 hours, a pressure release period of 1 hour and an atmospheric pressure period of 2 hours to obtain white polymer chips having an intrinsic viscosity of 1.1 at 25° C. in 96% sulfuric acid.

The resulting chips were treated with hot water to remove monomers. After being dried, they were spun by means of a conventional extruder type melt-spinning machine at a melting temperature of 260° C., and then drawing was carried out to obtain white drawn yarns of 70 d/24 f having a strength of 4.3 g/d and an elongation of 30%. The yarns did not snap during spinning and drawing, and the workability was good.

After cloth was knitted with these yarns so that the resulting cloth had a density of 50 g/m², the cloth was subjected to scouring and dyeing for 1 hour at 100° C. in a bath containing a blue disperse dye. The frictional static voltage of the resulting cloth and its half-life were 1,200 V and 12 seconds, respectively, and a good antistatic property was observed. These values hardly changed when home laundry (which comprised treating at room temperature for 10 minutes in a cleaning solution containing 1 g/l of a neutral detergent) was repeated 50 times.

COMPARATIVE EXAMPLE

When the same procedure as in Example 11 was carried out except that bis(3-aminopropyl ether) of polyethylene oxide and adipic acid were not added during production of polymer chips, yarn snapping and plumes occurred to a considerable extent during the melt spinning because of the inferior dispersion of N,N-bis-(polyoxyethylene)-N-stearyl-N-carboxymethyl ammonium betaine. Further, the frictional static voltage after being washed 50 times by home laundry and its half-life were 4,000 V and 100 seconds, respectively.

EXAMPLE 12

10 parts of chips of polyethylene terephthalate which was copolymerized with 30% by weight of an ethylene oxide adduct of 2,2-bis(p-hydroxyphenyl)propane (average molecular weight: 2,000), 88 parts of conventional polyethylene terephthalate chips and 2 parts of Na salt of N-β-hydroxylauryl-N,N-bis(polyoxyethylene)-N-carboxymethyl ammonium betaine (average molecular weight: 5,000) were blended. The resulting mixture was spun at a melting temperature of 280° C. Hot drawing was then carried out to obtain drawn yarns of 75 d/36 f having a strength of 4.5 g/d and an elongation of 31%. The spinning and drawing properties were good.

After weaving was carried out with these drawn yarns, a dyeing treatment was carried out at 120° C. for 1 hour in a disperse dye bath. The frictional static voltage of the dyed cloth and its half-life were 1,500 V and 13 seconds, respectively, and a good antistatic property was observed. This property hardly deteriorated after being washed 50 times by home laundry.

EXAMPLE 13

97 parts of chips of polyethylene terephthalate which was copolymerized with 1% by weight of an ethylene oxide adduct of bis(p-hydroxyphenyl)sulfone (average molecular weight: 4,000) and 3 parts of N,N-bis(polyoxyethylene)-N-lauryl-N-sulfomethyl ammonium betaine were blended. The resulting mixture was subjected to meltspinning and drawing according to Example 12.

After weaving was carried out with the resulting drawn yarns, dyeing was carried out. When the antistatic property was measured, the frictional static voltage and its half-life were 1,400 V and 12 seconds, respectively, and the antiwashing property was good.

While the invention has been described in detail and with reference to specific embodiments thereof, it will be apparent to one skilled in the art that various changes and modifications can be made therein without departing from the spirit and scope thereof.

What is claimed is:

1. A polymer composition, comprising:
    a polymer (A) having a zwitterion structure selected from the group consisting of a sulfo ammonium zwitterion structure and a carboxy ammonium zwitterion structure, wherein the polymer (A) is comprised of 80% by weight or more of a polyalkylene oxide component; and
    an organic synthetic copolyamide (B), wherein the copolyamide (B) is comprised of a polyalkylene oxide component.
2. A polymer composition as claimed in claim 1, wherein the polyalkylene oxide in both polymers (A) and (B) is selected from the group consisting of polyethylene oxide, polypropylene oxide and and ethylene oxide-polypropylene oxide copolymer.
3. A polymer composition as claimed in claim 1, wherein the copolyamide (B) is comprised of a major component selected from the group consisting of nylon 6, nylon 66, nylon 610, and nylon 12.
4. A polymer composition as claimed in claim 1, wherein the polyalkylene oxide in both polymers (A) and (B) component has a number average molecular weight of 400 to 20,000.
5. A polymer composition as claimed in claim 4, wherein the number average molecular weight is 800 to 15,000.
6. A polymer composition as claimed in claim 4, wherein the number average molecular weight is 1,000 to 10,000.
7. A polymer composition as claimed in claim 1, wherein the amount of the zwitterion structure in the polymer (A) is 30 equivalents/ton or more and the amount of polymer (A) in the polymer composition is 0.5 to 10% by weight.
8. A polymer composition as claimed in claim 1, wherein the amount of the polyalkylene oxide in the copolyamide (B) is 0.1 to 30% by weight.
9. A polymer composition as claimed in claim 1, wherein the amount of the polyalkylene oxide in the copolyamide (B) is 0.2 to 20% by weight.

* * * * *